United States Patent
Dehmas et al.

(10) Patent No.: US 9,438,307 B2
(45) Date of Patent: Sep. 6, 2016

(54) ROBUST TIME SHIFT TRACKING UWB RECEIVER

(71) Applicant: Commissariat A L'Energie Atomique et aux Energies Alternatives, Paris (FR)

(72) Inventors: Francois Dehmas, Vif (FR); Laurent Ouvry, Grenoble (FR); Manuel Pezzin, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 14/739,072

(22) Filed: Jun. 15, 2015

(65) Prior Publication Data
US 2015/0372715 A1    Dec. 24, 2015

(30) Foreign Application Priority Data

Jun. 18, 2014  (FR) ...................................... 14 55612

(51) Int. Cl.
| H04B 1/7075 | (2011.01) |
| H04B 14/04 | (2006.01) |
| H04B 1/7163 | (2011.01) |
| H04B 1/7183 | (2011.01) |
| H04L 5/00 | (2006.01) |

(52) U.S. Cl.
CPC .......... *H04B 1/7075* (2013.01); *H04B 1/7183* (2013.01); *H04B 1/71637* (2013.01); *H04B 14/04* (2013.01); *H04L 5/0023* (2013.01)

(58) Field of Classification Search
CPC .......................... H04B 1/71637; H04L 5/0023
See application file for complete search history.

(56) References Cited

U.S. PATENT DOCUMENTS

| 5,943,380 | A | * | 8/1999 | Marchesani | ........ | H04L 27/2273 |
| | | | | | | 375/332 |
| 2004/0136468 | A1 | | 7/2004 | Suzuki | | |
| 2010/0062726 | A1 | * | 3/2010 | Zheng | ................ | H04B 1/71637 |
| | | | | | | 455/74 |
| 2014/0243016 | A1 | | 8/2014 | Denis et al. | | |

(Continued)

FOREIGN PATENT DOCUMENTS

| FR | 2 996 970 A1 | 4/2014 |
| WO | WO 2008/063132 A1 | 5/2008 |

OTHER PUBLICATIONS

U.S. Appl. No. 14/435,370, filed Apr. 13, 2015, Francois Dehmas et al.

(Continued)

*Primary Examiner* — Shuwang Liu
*Assistant Examiner* — Ross Varndell
(74) *Attorney, Agent, or Firm* — Oblon, McClelland, Maier & Neustadt, L.L.P.

(57) ABSTRACT

A robust time shift tracking UWB receiver. After translating in baseband by a quadrature demodulator, the received UWB pulsed signal is integrated on successive time windows, and then sampled. The complex samples are then correlated with a coding sequence from the transmitter and then transmitted on the one hand to a phase estimator and a demodulating/detecting module. The latter estimates the symbol emitted and provides it to the estimator which removes the modulation effect for estimating, at each time-symbol, the phase of the complex samples. A phase rotation follow-up module determines a compensated phase rotation and a non-compensated phase rotation from a reference instant. Controlling means deduce from the non-compensated phase rotation a time offset to be applied to the integration windows.

14 Claims, 6 Drawing Sheets

(56) References Cited

U.S. PATENT DOCUMENTS

2014/0256353 A1    9/2014    Denis et al.
2014/0287776 A1    9/2014    Denis et al.

OTHER PUBLICATIONS

U.S. Appl. No. 14/435,283, filed Apr. 13, 2015, Francois Dehmas et al.
U.S. Appl. No. 14/435,338, filed Apr. 13, 2015, Laurent Ouvry et al.
French Preliminary Search Report issued Feb. 11, 2015 in French Application 14 55612, filed on Jun. 18, 2014 ( with English Translation of categories of Cited Documents).
Farid Bautista et al. "Low Power beamforming RF architecture enabling fine ranging and AOA techniques", 2011 IEEE International Conference on Ultra-Wideband (ICUWB), 2011, 5 pages.
Faten Salem et al. "Synchronization Using an Adaptive Early-Late Algorithm for IR-TH-UWB Transmission in Multipath Scenarios", Proc of ISWCS, 2005, 4 pages.

* cited by examiner

ROBUST TIME SHIFT TRACKING UWB RECEIVER

TECHNICAL FIELD

The present invention relates to the field of UWB (Ultra Wide Band) receivers and more particularly to the synchronization of such receivers.

STATE OF PRIOR ART

Pulsed type ultra Wide Band or UWB telecommunication systems are well known in the state of the art. In such a system, a symbol emitted by a transmitter is transmitted using a sequence of ultra-short pulses, in the order of one nanosecond to one hundred picoseconds.

FIG. 1A schematically illustrates the signal transmitted by a UWB transmitter, corresponding to a given information symbol. This signal consists of pulses being repeated with a repetition period $T_c$.

The signal transmitted by the transmitter, in the absence of modulation by modulation symbols, can be expressed in the following form:

$$s_{Tx}(t) = \sum_{k=0}^{N-1} p(t - kT_c)\cos(2\pi f_0(t - kT_c) + \varphi_0) \tag{1}$$

where p(t) is the form of the unit pulse in baseband, $f_0$ is the carrier frequency, $\phi_0$ is the phase at the origin, and $T_c$ is the repetition period. The duration $\tau$ of the unit pulse p(t) is substantially lower than the duration of the period $T_c$. The repetition period is generally but not necessarily chosen as an integer multiple of the carrier period.

The UWB signal transmitted by the transmitter can follow several propagation paths by reflection on the environment, in other words the propagation channel generally consists of P paths. Its pulsed response is then expressed in the following form:

$$h(t) = \sum_{p=0}^{P-1} h_p \delta(t - t_p) \tag{2}$$

where $h_p$, p=1, . . . , P are the coefficients of the channel.

The UWB signal received by the receiver is the result of the convolution of the signal transmitted by the pulsed response of the channel, that is:

$$s_{Rx}(t) = \sum_{k=0}^{N-1}\sum_{p=0}^{P-1} h_p p(t - t_p - kT_c)\cos(2\pi f_0(t - t_p - kT_c) + \varphi_0) + n_0(t) \tag{3}$$

where $n_0(t)$ is the noise at the receiver.

The UWB signal can be modulated for transmitting modulation symbols, for example PAM (Pulse Amplitude Modulation) symbols, (D)BPSK ((Differential) Binary Phase Shift Keying) symbols, or even PPM (Pulse Position Modulation) modulation symbols.

The modulated signal received by the receiver can then be expressed as follows:

$$s_{Rx}(t) = \sum_{k=0}^{N-1} a_k \sum_{p=0}^{P-1} h_p p(t - t_p - kT_c)\cos(2\pi f_0(t - t_p - kT_c) + \varphi_0) + n_0(t) \tag{4}$$

where $a_k$, k=0, . . . , N−1 are the modulation symbols, PAM or (D)BPSK. It will be noted that in the expression (4), a modulation symbol is transmitted over a single repetition period.

In the case of a PPM modulation, the expression of the modulated signal takes the following form:

$$s_{Rx}(t) = \tag{4'}$$
$$\sum_{k=0}^{N-1}\sum_{p=0}^{P-1} h_p p(t - t_p - kT_c - m^{(k)}\varepsilon)\cos(2\pi f_0(t - t_p - kT_c) + \varphi_0) + n_0(t)$$

where $m^{(k)}$ is a PPM modulation symbol belonging to an alphabet PPM of M time positions and $\epsilon$ is a unit duration such that $\epsilon \ll T_c$.

By way of illustration, FIG. 1B represents an exemplary UWB signal modulated by BPSK modulation symbols in the case of a mono-path channel (P=1).

For demodulating the received signal and recovering the modulation symbols, the receiver has to temporally track the UWB pulses on each of the channel paths before combining them using a RAKE filter. In the absence of any variation in the delays $t_p$ of the channel, this time tracking is necessary to compensate for the synchronization drift of the receiver with respect to the transmitter, causing a drift in the repetition frequency of the integration windows of the receiver with respect to the repetition frequency of the pulses.

A first method of synchronizing a receiver on the pulses of a UWB signal is described in the paper of F. Salem et al. entitled "Synchronization using an adaptive early-late algorithm for IR-TH-UWB transmission in multipath scenarios" published in Proc. of ISWCS, 7 Sep. 2005, pp. 267-271. According to this synchronization method, the tracking is made by carrying out a filtering adapted to the pulse transmitted and sampling the output of the filter adapted in three successive instants: a current instant assumed to correspond to the arrival time of the pulse (giving an "on time" sample), a previous instant (giving an "early" sample) and a next instant (giving a "late" sample). The comparison between the amplitudes of the "early" and "late" samples enables the current sampling instant to be delayed or advanced within the repetition period.

However, the drawback of this method is that it requires the use of three analog-to-digital converters per path as well as analog matched filters.

A second method of synchronizing a UWB receiver is described in patent application US-A-2004/0136468. This method performs the time tracking of UWB pulses from the phase variation observed between two consecutive symbols. This synchronization method can however only operate when the repetition frequency is a sub-multiple of the carrier frequency of the signal.

The purpose of the present invention is consequently to provide a pulsed UWB signal receiver with time tracking of the pulses, which is relatively simple and robust, and does not require to impose a particular relationship between the repetition frequency of the pulses and the carrier frequency. Another object of the present invention is to provide a method for receiving a UWB signal with time tracking of the pulses, which has the same advantages.

DISCLOSURE OF THE INVENTION

The present invention is defined by a time shift tracking UWB receiver, for receiving a pulsed UWB signal, the pulsed UWB signal comprising pulses following each other with a first repetition period ($T_c$), modulated at a carrier frequency, said pulsed UWB signal being further modulated to transmit information symbols, each information symbol being transmitted over a time-symbol ($RLT_c$) during which the information symbol is repeated a plurality (R) of times, said receiver comprising:
  a quadrature mixer for translating in baseband said pulsed UWB signal using a translation frequency, equal, within one offset, to said carrier frequency;
  an integrating stage for integrating said signal thus translated in baseband, during selected time windows, each selected time window being repeated with a second period ($T_1$);
  a sampling stage for sampling the integration results on said selected time windows and providing a complex sample for each of them;
  a demodulating/detecting module for estimating said information symbols from the complex samples thus obtained;
  a phase estimator, for estimating at each time-symbol, the phase of the complex samples, free of the modulation due to the information symbols thus estimated;
  a phase rotation follow-up module for following up on the one hand the rotation of the phase thus estimated from a reference instant and on the other hand a rotation of phase already compensated from this same instant, and deducing therefrom a non-compensated phase rotation;
  controlling means applying a time offset to said time windows to compensate for at least one part of said non-compensated phase rotation.

Advantageously, the controlling means receive the non-compensated phase rotation, $\Delta\Phi_{uc}$, and offset the integration windows as well as the sampling instants by $$-\frac{\Delta\Phi_{uc}}{2\pi f_1},$$

the time offset being applied to each time-symbol.

According to one alternative, the controlling means receive the non-compensated phase rotation, $\Delta\Phi_{uc}$ compare it with a threshold value $\Delta\Phi_{th}$, and when $|\Delta\Phi_{uc}|$ exceeds the threshold value, offset the integration windows as well as the sampling instants by $$-\frac{\Delta\Phi_{th}}{2\pi f_1}\mathrm{sgn}(\Delta\Phi_{uc})$$

where $\mathrm{sgn}(\Delta\Phi_{uc})$ is the sign of $\Delta\Phi_{uc}$.

According to one first exemplary embodiment, the phase estimator estimates the phase of the complex samples, free of the modulation effect, from the complex samples relating to the highest energy path of the transmission channel.

According to a second exemplary embodiment, the phase estimator comprises a coherent RAKE filter to combine complex samples relating to different paths of the transmission channel using complex coefficients of these paths, the phase of the complex samples free of the modulation effect being then estimated from thus combined complex samples.

According to an advantageous embodiment, each time-symbol contains a plurality of modulation symbols associated with the information symbol transmitted over this time-symbol, each modulation symbol being spread using a spread code with a length $L\geq 1$ to provide a coded sequence, each chip of the coded sequence modulating a pulse of the UWB signal, the receiver then comprising a correlating stage, correlating the complex samples with the spread code before providing them to the demodulating/detecting module as well as to the phase estimator.

Said modulation symbols can be obtained from the repeated information symbols, by means of a PSK type modulation.

Alternatively, said modulation symbols can be obtained from the repeated information symbols, by means of a PPM type modulation.

Further alternatively, said modulation symbols can be obtained from the repeated information symbols, by means of a DBPSK modulation.

In the latter case, the phase estimator advantageously comprises a repeater for repeating the information symbols provided by the demodulating/detecting module, a DBPSK modulator for generating modulation symbols from the information symbols thus repeated, a coherent accumulator for accumulating the complex samples signed by the successive modulation symbols and a phase calculating module for determining the phase of the sum thus accumulated.

Further, in this case, the phase rotation follow-up module can comprise a detector of crossings of the phases $(2\kappa+1)\pi/4$, $\kappa=0,1,2,3$, the detector algebraically counting the crossings, a crossing in the counter clockwise direction being counted at a first polarity and a crossing in the clockwise direction being at a reverse polarity to the first polarity.

Finally, the demodulating/detecting module can comprise hermitian multiplication means for providing the hermitian product of each complex sample with the preceding sample, an incoherent RAKE filter for combining the hermitian products relating to different paths of the transmission channel, a coherent accumulator for accumulating the combined hermitian products thus obtained over the duration of a time-symbol and a decision making module for making, at each time-symbol, a hard decision on the information symbol from the accumulation result provided by the coherent accumulator.

Similarly, the invention relates to a method for receiving with time tracking, a pulsed UWB signal, the pulsed UWB signal comprising pulses following each other with a first repetition period ($T_c$), modulated at a carrier frequency, said pulsed UWB signal being further modulated for transmitting information symbols, each information symbol being transmitted over a time-symbol ($RLT_c$) during which the information symbol is repeated a plurality (R) of times, said method comprising:
  a step of quadrature mixing for translating in baseband said pulsed UWB signal using a translation frequency, equal, within one offset, to said carrier frequency;
  a step of integrating the signal thus translated in baseband, during selected time windows, each selected time window being repeated with a second period ($T_c$);
  a sampling step for sampling the integration results on said time windows and providing a complex sample for each of them;

a demodulating/detecting step for estimating said information symbols from the complex samples thus obtained;

a phase estimating step estimating, at each time-symbol, the phase of the complex samples, free of the modulation due to the information symbols thus estimated;

following up the phase rotation for following up on the one hand the rotation of the phase thus estimated from a reference instant and on the other hand a rotation of a phase already compensated from the same instant, and deducing therefrom a non-compensated phase rotation;

a step of controlling the time windows applying a time offset to said time windows to compensate for at least one part of said non-compensated phase rotation.

According to an advantageous embodiment, each time-symbol contains a plurality of modulation symbols associated with the information symbol transmitted on this time-symbol, each modulation symbol being spread using a spread code with a length L≥1 to provide a coded sequence, each chip of the coded sequence modulating a pulse of the UWB signal, said method further comprising a correlating step correlating the complex samples with the spread code before providing them to the demodulating/detecting step and the phase estimating step.

BRIEF DESCRIPTION OF THE DRAWINGS

Further characteristics and advantages of the invention will appear upon reading a preferential embodiment of the invention, making reference to the appended figures from which.

DETAILED DISCLOSURE OF PARTICULAR EMBODIMENTS

In the following, a UWB receiver intended to receive a pulsed type UWB signal will be considered.

For the sake of simplifying the presentation of the invention, a method for synchronizing the receiver in the case where the pulsed UWB signal is non-modulated will be first described.

As set out in the introductory part, this signal is in baseband as a periodic sequence of ultra-short pulses (in the order of a fraction of nanosecond to a few nanoseconds), separated by a repetition period $T_c$. It will be assumed, in the general case, that the signal in baseband is then translated into frequency by modulation of a carrier at a RF frequency, $f_0$. No particular relationship is assumed herein between the repetition frequency and the carrier frequency. The signal transmitted by the transmitter is then given by the expression (1) and the signal received by the receiver, after propagation on a multi-path propagation channel is given by the expression (3).

Figure 1A:
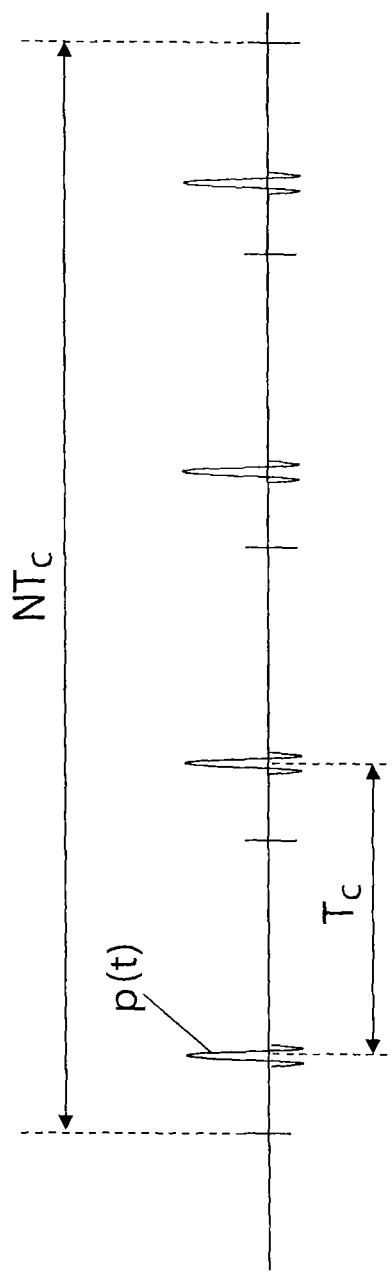
FIG. 1A, already described, represents an exemplary pulsed type UWB signal.
Figure 1B:
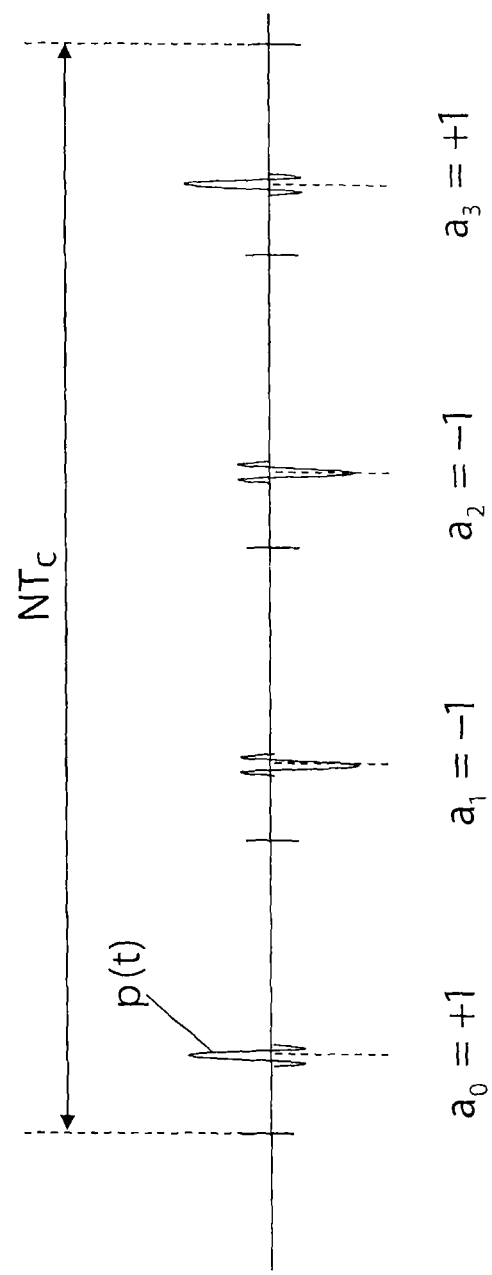
FIG. 1B, already described, represents an exemplary pulsed type UWB signal, modulated by modulation symbols.
Figure 2:
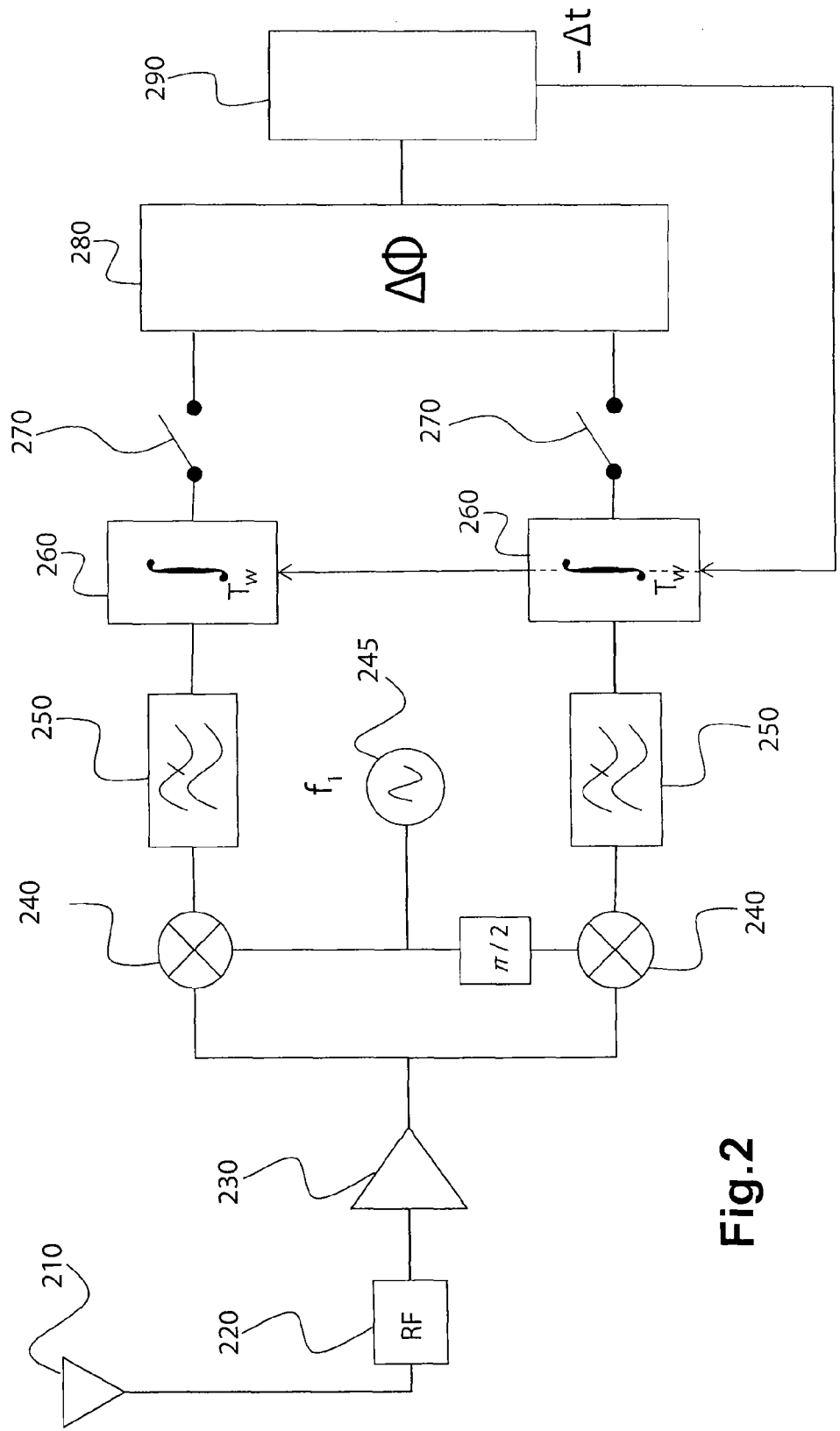
FIG. 2 schematically represents the structure of a UWB receiver useful for understanding the invention.

FIG. 2 schematically illustrates the structure of a UWB receiver useful for understanding the invention.

The signal $s_{Rx}$, received by the antenna 210 is filtered by an RF filter 220 and then amplified by a low noise amplifier (LNA), 230, before being translated in baseband by means of a quadrature mixer, 240.

The mixer uses a frequency $f_1$ provided by the local oscillator 245, ideally equal to $f_0$ but in practice offset by an offset, due to the oscillator drift. The in-phase and phase quadrature signals are then filtered using low pass (or band pass) filters 250 and then integrated, by an integrating stage 260, on successive time windows with a width $T_w$. The time windows follow each other with a periodicity $T_w$. After integration, the in-phase and quadrature signals are sampled at the frequency $1/T_w$ by the sampling stage 270.

The phase estimator 280 receives the complex successive samples obtained (I and Q channels) and deduces therefrom the phase offset between two samples separated by q sampling periods, where $qT_w \simeq T_c$.

The receiver further comprises controlling means 290 receiving the phase shift provided by the phase estimator 280 and controlling the position of the integration window as well as the sampling instant. The controlling means 290 operate as a Delay Lock Loop (DLL) by delaying more or less the beginning of the integration window with respect to the received signal and, correlatively, the sampling instant.

The operation of the controlling means 290 is explained herein below.

After quadrature mixing and band-pass filtering, the complex signal, before integration in 260, is given by:

$$r(t) = \sum_{k=0}^{L-1} \sum_{p=0}^{P-1} h_p p(t - t_p - kT_c) \qquad (5)$$

$$\exp(2\pi(f_0 - f_1)t - j2\pi f_0(t_p + kT_c) + j(\varphi_0 - \varphi_1)) + n_1(t) =$$

$$\sum_{k=0}^{L-1} p_r(t - kT_c) \exp(j2\pi(f_0 - f_1)t - j2\pi f_0 kT_c + j(\varphi_0 - \varphi_1)) + n_1(t)$$

where $n_1(t)$ is the noise mixed and filtered, $\phi_1$ is the phase of the local oscillator, and by setting:

$$p_r(t) = \sum_{p=0}^{P-1} h_p p(t - t_p) \exp(-j2\pi f_0 t_p) \qquad (6)$$

The signal r(t) is integrated during successive integration windows of a duration $T_w$. In other words, the time is cut out into successive windows $W_n = [t_0 + nT_w, t_0 + (n+1)T_w]$ where $t_0$ is an instant giving the starting point of the integration. It will be understood that a variation in $t_0$ offsets the integration windows with respect to the received signal.

The complex signal after integration in the window $W_n$ is noted $r_w[n]$ where $$r_w[n] = \sum_{t_0+nT_w}^{t_0+(n+1)T_w} r(t)dt.$$

If it is assumed that the support of $p_r(t)$ is lower than $T_c$, in other words that there is no inter-pulse interference due to the multiple paths (in the opposite case, the interference can be considered as a noise component), the value $r_w[n]$ is reduced to:

$$r_w[n] = \int_{t_0+nT_w}^{t_0+(n+1)T_w} (p_r(t-k_nT_c) \times \qquad (7)$$
$$\exp(j2\pi(f_0-f_1)t - j2\pi f_0 k_n T_c + j(\varphi_0 - \varphi_1)) + n_1(t))dt$$

where $k_n$ is the integer such that $p_r(t-k_nT_c)$ is not null everywhere on the integration window $W_n$ (there is at least one integer $k_n$ satisfying this property on the repetition period of the pulses). Insofar as the repetition period of the pulses, $T_c$, is in the order of a multiple of the duration of the integration window ($T_c \simeq qT_w$), there is only one integer $k_n$ satisfying the previous condition.

The synchronization of the receiver requires that the integer q is known such that $T_1 = qT_w$ best approaches the period of the pulses, $T_c$. If there is $T_1 \simeq T_c$, the coverage configuration of the function $p_r(t)$ with the integration windows is repeated after q windows, in other words $k_{n+q} = k_n + 1$ and:

$$r_w[n+q] = \int_{t_0+nT_w}^{t_0+(n+1)T_w} (p_r(t+T_1-(k_n+1)T_c) \times \qquad (8)$$
$$\exp(j2\pi(f_0-f_1)(t+T_1) - j2\pi f_0(k_n+1)T_c + j(\varphi_0 - \varphi_1)))dt$$

where the noise term has been omitted.

The value $r_w[n+q]$ can be equivalently written as:

$$r_w[n+q] = \int_{t_0+nT_w+T_1-T_c}^{t_0+(n+1)T_w+T_1-T_c} (p_r(t-k_nT_c) \times \qquad (9)$$
$$\exp(j2\pi(f_0-f_1)(t+T_c) - j2\pi f_0(k_n+1)T_c + j(\varphi_0 - \varphi_1)))dt$$

It is assumed that $T_1 \simeq T_c$, and more precisely that $|T_1-T_c| \ll T_w$, hence:

$$r_w[n+q] \simeq \int_{t_0+nT_w}^{t_0+(n+1)T_w} (p_r(t-k_nT_c) \times \qquad (10)$$
$$\exp(j2\pi(f_0-f_1)(t+T_c) - j2\pi f_0(k_n+1)T_c + j(\varphi_0 - \varphi_1)))dt$$

the equality being exact if $T_1 = T_c$ or if the received signal is null at the edges of the integration window. Finally, there is:

$$r_w[n+q] \simeq r_w[n]\exp(-j2\pi f_1 T_c) \qquad (11)$$

The relationship (11) expresses the phase shift between two integration results separated by q integration windows.

The integration results are obtained at the output of the samples 270 and the detector 280 determines the phase shift between samples separated by q sampling periods $T_w$:

$$\Delta\phi = \arg(r_w[n+q]r^*_w[n]) = -2\pi f_1 T_c \qquad (12)$$

If $$\delta = \frac{T_1 - T_c}{T_1}$$

is the relative deviation between the period of the pulses, $T_c$, which are emitted by the transmitter and the period, $T_1$, used by the receiver and taking into account that $f_1 T_1$ is generally a integer Q (the period $T_1$ is obtained by frequency division of a clock at the frequency $f_1$), the phase shift $\Delta\phi$ can be expressed as a function of the aforesaid relative deviation modulo $2\pi$:

$$\Delta\phi = -2\pi Q\delta[2\pi] \qquad (13)$$

It will be understood that the phase shift $\Delta\phi$ reflects a time sliding $(-\Delta\phi/2\pi Q)T_1$ of the integration windows with respect to the received signal, said time sliding being here determined by the detector with a periodicity $T_1$. The time sliding could be unequivocally determined, without folding, if $|\Delta\phi| < \pi$ that is $$|\delta| < \frac{1}{2Q}.$$

The synchronization of the receiver consists in correcting this time sliding such that the pulses received do not slide with respect to the integration windows, in other words the synchronization consists in temporally tracking the pulses.

To that end, the controlling means, 290, vary the beginning of the integration windows as a function of the phase shift determined by the detector 280. If the time sliding is $\delta t = (-\Delta\phi/2\pi Q)T_1$, the beginning of the integration windows will be offset by $-\delta t = (\Delta\phi/2\pi Q)T_1$. It will be noted that the correction of the time sliding by the controlling means is carried out here with a periodicity $T_1$. Optionally, the beginning of the integration windows could be advanced or delayed by a multiple of a time pitch $\delta T_w$, the sampling instant being thus advanced or delayed by the same.

In this case, the controlling means, 290 perform an accumulation of the phase shifts $\Delta\phi$ obtained over a plurality $n_T$ of successive periods $T_1$:

$$\Delta\Phi = \sum_{n=0}^{n_T-1} \Delta\phi_n \qquad (14)$$

The time offset cumulated (by a vernier effect) over $n_T$ successive periods can be determined as previously by:

$$\Delta t = (-\Delta\Phi/2\pi Q)T_1 \qquad (15)$$

With a periodicity $n_T T_1$, the controlling means 290 calculate the time sliding cumulated and offset the beginning of the integration windows and the sampling instants by a time $-\Delta t = (\Delta\Phi/2\pi Q)T_1$.

Alternatively, the time sliding can be cumulated until it reaches a sampling period $T_w$, the windows being then offset by this period.

It will be noted that the correction of the time sliding is carried out by the controlling means 290. If the offset is made by a multiple pitch of a time pitch $\delta T_w$, the correction to be applied is $$\left\lfloor \frac{\Delta t}{\delta T_w} \right\rfloor$$

time pitches where $\lfloor x \rfloor$ designates the integer value of x.

It is understood that the receiver of FIG. 2 can thus constantly correct its time drift with respect to the received signal. The samples provided by the sampling stage 270 are then synchronous with the pulses of the received signal and can be processed by the receiver.

It has been assumed in the above disclosure that the signal transmitted by the transmitter was non-modulated (expression (1)).

Now, it is assumed, within the context of the present invention, that the transmitted signal is modulated for transmitting information symbols.

More precisely, each information symbol $b_i$ to be transmitted over a time-symbol, for example each bit, is first repeated a number R-1 of times where R>1 (in other words, there is a series of R information symbols $b_i$). The information symbols thus repeated are then modulated using a PSK (preferably BPSK), DPSK (preferably DBPSK), PAM or even PPM modulation. In practice, when the modulation order (in other words the cardinal of the modulation alphabet) is of the form $2^v$, the number R is chosen as a multiple of v. In any case, a series of modulation symbols $a_m^{(i)}$ representing the information symbol $b_i$ is obtained. The modulation symbols can then be coded using a transmitter-specific code, also called spreading code, wherein this code can be part of a family of orthogonal codes such as a family of Hadamard codes and allows the signal transmitted by different transmitters to be separated at the receiver. Thus, each modulation symbol, $a_m^{(i)}$, is then coded by a code $c_k$, k=0, ..., L-1, and gives rise to a sequence $c_k a_m^{(i)}$, k=0, ..., L-1. This sequence then modulates the UWB signals, the elements of the sequence multiplying successive pulses of the signal. The series of pulse sequences corresponding to a same information symbol is hereinafter called a super-sequence. Therefore, it will be understood that a super-sequence consists of RL UWB pulses and that this super-sequence is transmitted over a time symbol. Although the coding of modulation symbols is not required for the implementation of the invention (in this case L=1), the power spread it introduces enables the peak transmission power to be reduced and thus to comply more readily with the spectral density requirements of the UWB template. Further, it enables signals received by different transmitters to be separated and the signal to noise plus interference ratio to be improved, in particular in the case of a long range transmission (terminal at a cell border).

Figure 3:
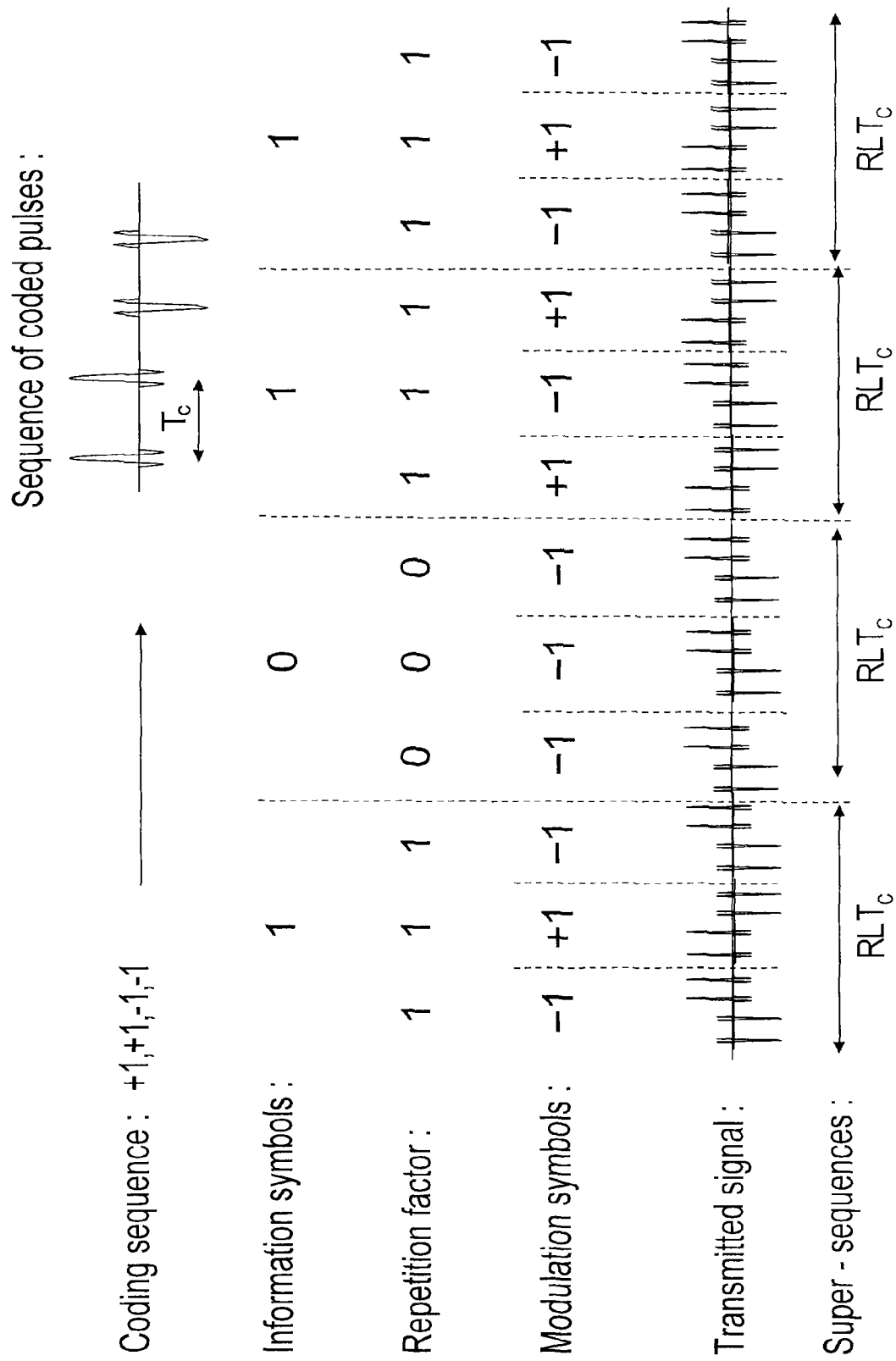
FIG. 3 represents an example of switching from information symbols to pulse super-sequences.

FIG. 3 gives an example of switching from information symbols to super-sequences of pulses.

In this example, the (binary) information symbols to be transmitted have been indicated in the second row. Each information symbol is transmitted over a time-symbol represented by an interval between two dashed lines. Each information symbol is herein repeated three times, as indicated in the third row. The series of the information symbols thus repeated is then DBPSK modulated, a bit 1 reflecting a polarity reversal and a bit 0 reflecting a polarity maintenance, as indicated in the fourth row. Each BPSK (+1, -1) symbol is then coded using a transmitter-specific code (the code used is indicated in the first row of the figure) to modulate a sequence of L successive pulses of the base UWB signal, as represented in the last row. All the pulse sequences corresponding to a same information symbol form a super-sequence.

In the case of a PSK or BPSK modulation, the signal transmitted by the transmitter can be represented by:

$$s_{Tx}(t) = \text{Re}\left( \sum_{i=0}^{N-1} a_m^{(i)} \sum_{k=0}^{L-1} c_k p(t - (k + iN_c)T_c) \right. \tag{16}$$
$$\left. \exp(j(2\pi f_0(t - (k + iN_c)T_c) + \varphi_0)) \right)$$

where N is the number of information symbols, after repetition (in other words N/R information symbols are actually transmitted), $a_m^{(i)}$, i=1, ..., N-1, represent the modulation symbols and $c_k \in \{+1,-1\}$, k=0, ..., L-1 is the code used by the transmitter.

In the case of a PPM modulation, the signal transmitted by the transmitter can be represented by:

$$s_{Tx}(t) = \sum_{i=0}^{N-1} \sum_{k=0}^{L-1} c_k p(t - (k + iN_c)T_c - m^{(i)}\varepsilon) \tag{17}$$
$$\cos(2\pi f_0(t - (k + iN_c)T_c - m^{(i)}\varepsilon) + \varphi_0)$$

where, once again, N represents the number of information symbols, after repetition where $m^{(i)}$ is a PPM modulation symbol at M time positions. If the modulation alphabet is 2-PPM, preferably $$\varepsilon = \frac{T_c}{2} \text{ and } m \in \{0, 1\}$$

is chosen. For example, a bit value equal to 0 will be coded by the position 0 and a bit value equal to 1 will be coded by the position $$\frac{T_c}{2},$$

in other words, a bit equal to 0 will be reflected by a pulse in the first part of the period and a bit equal to 1 will be reflected by a pulse in the second part of the period.

The signal $s_{Rx}(t)$ received by the receiver is in any case obtained by convoluting the signal transmitted by the pulsed response of the channel, in other words by replacing in the expressions (16) and (17) the waveform p(t) with $$p_r(t) = \sum_{p=0}^{P-1} h_p p(t - t_p) \exp(-j2\pi f_0 t_p).$$

Figure 4:
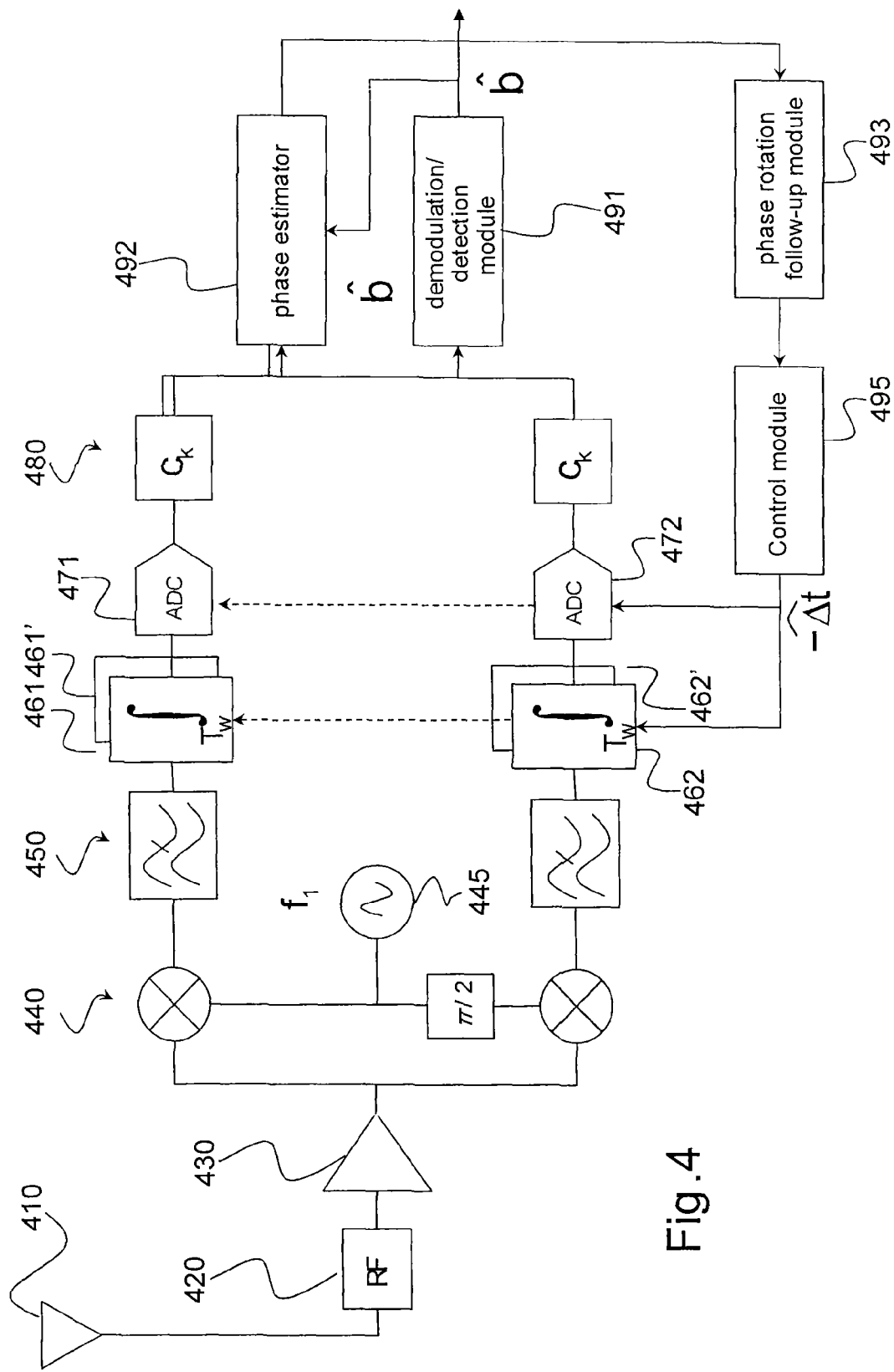
FIG. 4 schematically represents a UWB receiver according to one embodiment of the invention.

FIG. 4 represents a time drift tracking UWB signal receiver, according to an embodiment of the invention.

The receiver comprises, as that illustrated in FIG. 2, a UWB antenna 410, an RF filter 420, a low noise amplifier 430, a quadrature mixer 440, using a frequency $f_1$ provided by a local oscillator 445. The in-phase and quadrature signals are then filtered using low-pass filters 450, and then integrated in an integrating stage 460, comprising a first integrator 461, in the in-phase channel and a second integrator 462, in the quadrature channel. The first and second integrators integrate the signal on a same time window having a width $T_w$. The analog/digital converters (ADC) 470, sample and digitize the integration results thus obtained.

Ideally, the available integration windows follow each other with a periodicity $T_w$. However, in order to process the case where a pulse straddles two successive integration windows, in practice two integrators multiplexed on each of the I and Q channels (represented in the background) are provided, the integration window of one integrator on one channel being offset by $T_w/2$ to the integration window of the other integrator on the same channel. Further, the beginning of the integration windows can be offset by a time pitch substantially lower than the duration $T_w$.

Figure 5:
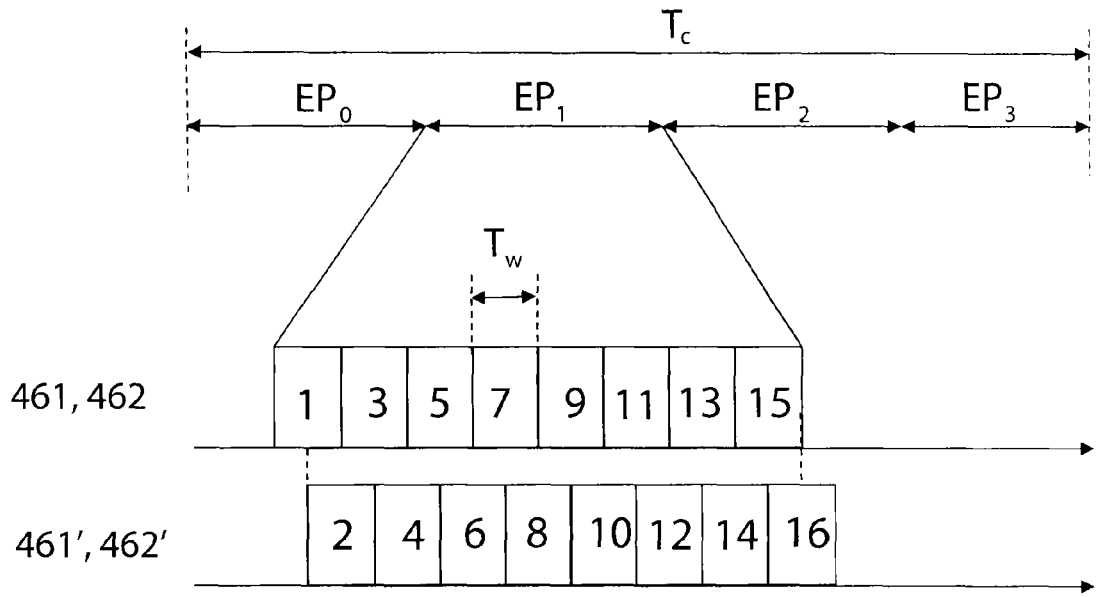
FIG. 5 represents a timing chart of the integration windows that can be used in the receiver of FIG. 4.

FIG. 5 represents the cutting off of a repetition period into integration windows. More precisely, each repetition period $T_c$ is divided into a plurality of unit periods $EP_0, \ldots, EP_{\eta-1}$ (herein $\eta=4$) and each unit period is itself divided into a first series of integration windows and a second series of integration windows, all of the duration $T_w$, such that a window of the first series covers two successive windows of the second series and vice-versa (overlapping rate of 50%).

In the particular example represented, the repetition period $T_c$ is 64 ns, the unit periods are 16 ns (4 unit periods per repetition period) and each unit period comprises 16 overlapping integration windows with a duration of 2 ns, the even-row integration windows (e.g. for the integrators 461' and 462') being offset by 1 ns with respect to the odd-row integration windows (for example for the integrators 461 and 462).

In practice, a predetermined number of integration windows available within a same unit period is provided, so as to have not too high a flow rate at the input of the converter. Several windows can be placed on pulses within the repetition period, each window corresponding to a finger of a RAKE filter. Then, the P time windows (that is the P paths having the highest energy) are selected from all the windows available, to feed P fingers of the RAKE filter, as detailed later.

Turning back to FIG. 4, the samples at the output of the converters are provided to correlating module 480, making a coherent summation on the code sequence, thus over a duration $LT_c$. It is assumed that the receiver determines in a prior learning phase, for example by means of a sequence of pilot symbols, the beginning of the payload. It consequently knows the symbol frame and, in particular, the instants at which the code sequences start. It is further assumed that the receiver has carried out, in this learning phase, a channel estimation and consequently knows the propagation times $t_p$, $p=1, \ldots, P$ of the different paths. Thereby, it can recover complex samples relating to each path.

If $r_k$ represents the complex samples provided by the converters, the module 480 carries out the correlation (or despreading):

$$\tilde{r}^{(i)} = \sum_{k=0}^{L-1} c_k r_k^{(i)} \qquad (18)$$

where i is an index which indexes herein the modulation symbols and where the counting of samples has been conventionally chosen to start at the sequence beginning.

It should be noted that the module 480 is optional, being not provided in the absence of coding on the transmitter side.

The complex samples (I and Q channels) obtained by the correlating module 480 (or directly provided by the ADC converters in the absence of correlation) are provided on the one hand to a demodulating and detecting module 491 and, via an FIFO buffer (not represented) to a phase estimator 492. The FIFO buffer delays the samples by a time $LRT_c$, in other words by a super-sequence or, equivalently, by a time-symbol (a period for transmitting information symbols).

The demodulating and detecting module 491 retrieves the information symbols transmitted by means of a hard decision, as described latter. The information symbols estimated by the module 491 are also provided to the phase estimator 492.

The phase estimator 492 receives, on the one hand, the information symbols estimated by the module 491 and, on the other hand, the complex samples, that is the integration results optionally correlated with the code, in 480. From the information symbols, the phase estimator determines the corresponding modulation symbols and removes the effect due to this modulation from the complex samples. The phase estimator then estimates, at each time-symbol, the phase $\hat{\phi}$ of the complex samples free of the modulation effect.

The phase rotation follow-up module 493 receives thus estimated phase $\hat{\phi}$, and deduces the rotation of this phase over time from an arbitrary reference instant. This reference instant can be for example the preamble end of the data packet.

The phase rotation follow-up module also follows up the phase rotation already compensated from the reference instant $\Delta\Phi_c$, the compensation of the phase rotation being made using the controlling means 495, as described later. The non-compensated phase rotation $\Delta\Phi_{uc}$ is obtained at each time-symbol as the difference between the phase rotation and the already compensated phase rotation. The phase rotation follow-up module updates $\Delta\Phi_c$ at each phase compensation.

The controlling means 495 receive, at each time-symbol, the non-compensated phase rotation $\Delta\Phi_{uc}$ and apply optionally a time offset to said integration windows to compensate for all or part of said non-compensated phase rotation $\Delta\Phi_{uc}$.

According to a first alternative of the controlling means, all $\Delta\Phi_{uc}$ is periodically compensated for by the controlling means by offsetting the integration windows as well as the sampling instants by $$-\frac{\Delta\Phi_{uc}}{2\pi f_1}.$$

The compensated phase rotation is correlatively updated within the phase follow-up means by $\Delta\Phi_c = \Delta\Phi_c + \Delta\Phi_{uc}$. The phase compensation can be carried out at each time-symbol or even every $n_T$ time symbol where $n_T$ is a non-null integer.

According to a second alternative, the controlling means compare the absolute value of the non-compensated phase rotation $|\Delta\Phi_{uc}|$, with a threshold value $\Delta\Phi_{th}$. When $|\Delta\Phi_{uc}|$ exceeds the threshold value, the controlling means offset the integration windows as well as the sampling instants by $$-\frac{\Delta\Phi_{th}}{2\pi f_1}\text{sgn}(\Delta\Phi_{uc})$$

where $\text{sgn}(\Delta\Phi_{uc})$ is the sign of $\Delta\Phi_{uc}$. The compensated phase rotation is correlatively updated within the phase follow-up means by $\Delta\Phi_c=\Delta\Phi_c+\text{sgn}(\Delta\Phi_{uc})\Delta\Phi_{th}$. The advantage of the second alternative is to conduct a very simple implementation since the time offset applied is constant except for the sign.

The phase estimator 492 will be described hereinafter.

According to a first alternative, it is assumed that the phase estimator selects the channel path having the highest energy, called hereinafter the predominant path, in other words the path p for which $|h_p|$ is maximum. It is generally the first path when the transmitter is visible in the line of sight (LOS).

When the modulation is of the PSK type, the phase estimator 492 estimates the phase of the complex samples, free of the modulation effect, by:

$$\hat{\varphi}=\arg\sum_{i=0}^{R-1}(\tilde{r}^{(i)}\hat{a}^*) \qquad (19)$$

where $\tilde{r}^{(i)}$ is the complex sample (the index i starts herein at the beginning of the time-symbol) and $\hat{a}$ is the modulation symbol corresponding to the information symbol $\hat{b}$ estimated by the module 491.

When the modulation is of the DBPSK type, the phase estimator 492 estimates the phase of the complex samples, free of the modulation effect, by:

$$\hat{\varphi}=\arg\left(\sum_{i=0}^{R-1}\tilde{r}^{(i)}\hat{a}_i\right) \qquad (20)$$

where $\tilde{r}^{(i)}$ is the complex sample and the $\hat{a}_i$ are the DBPSK modulation symbols corresponding to the information symbol estimated by the module 491.

When the modulation is of the PPM type, the phase estimator 492 estimates the phase of the complex samples, free of the modulation effect, by:

$$\hat{\varphi}=\arg\left(\sum_{i=0}^{R-1}(\tilde{r}^{(i)}\exp(2\pi jf_1m\varepsilon))\right) \qquad (21)$$

where m is the modulation position relating to the current estimated information symbol.

It has been assumed in the first alternative that only the predominant path of the channel was selected. According to a second alternative, a combination of the correlation results associated with the P paths using a coherent RAKE filter is performed, prior to the phase estimation (21), (22) or (23). Therefore, this brings back to the previous single path case. By coherent RAKE filter, it is meant a filter combining the different fingers after they have been respectively weighted by the conjugated complex coefficients of the different paths (a so-called MRC combination).

Figure 6:
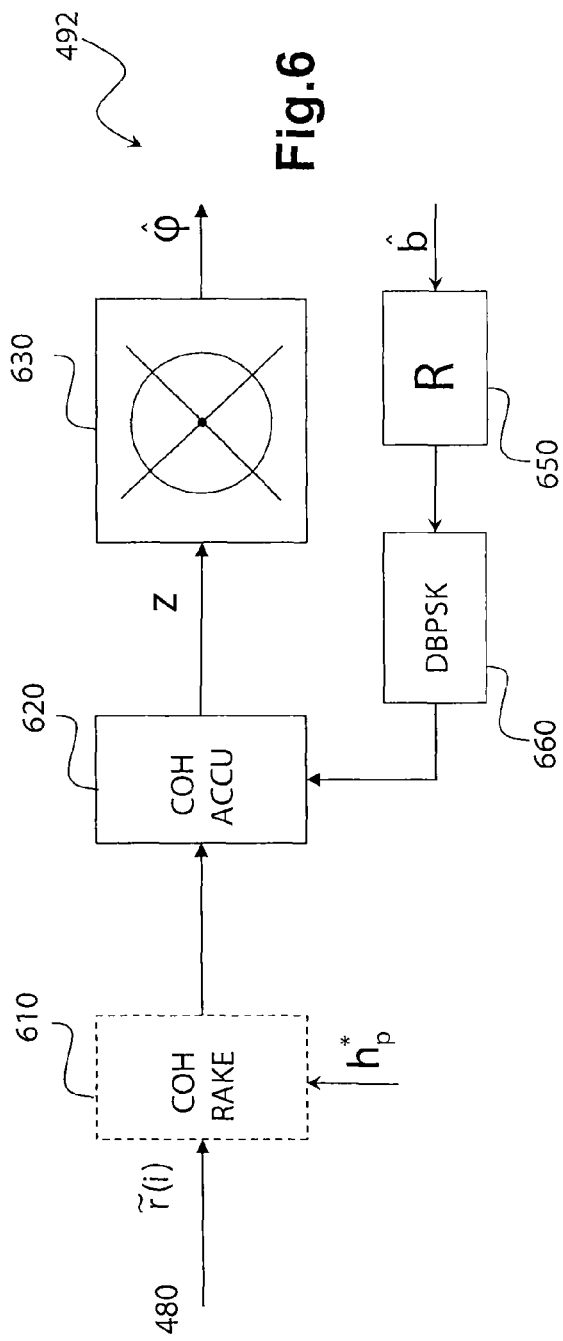
FIG. 6 schematically represents an exemplary embodiment of the phase estimator in the receiver of FIG. 4.

FIG. 6 represents an advantageous exemplary embodiment of the phase estimator 492, when the modulation used at the transmitter is of the DBPSK type.

The phase estimator 492 comprises a coherent RAKE filter 610, carrying out, for a same modulation symbol, an MRC combination of the correlation results relating to the different paths. Failing that, only the correlation result relating to the highest energy path is taken into account.

The phase estimator 492 receives on the other hand, the estimated information symbols, $\hat{b}$ from the demodulating and detecting module 491. Each estimated information symbol $\hat{b}$ is repeated R times in the repeater 650. Thus repeated information symbols are provided to a DBPSK modulator 660.

The modulation symbols $\hat{a}_i$ from the modulator 660 are provided to a coherent accumulator 620. This accumulator calculates the sum $$z=\sum_{i=0}^{R-1}\tilde{r}^{(i)}\hat{a}_i$$

over each time-symbol, and the phase of the sum thus obtained is then determined by the phase calculating module 630.

According to an advantageous embodiment, the phase is quantified according to a plurality of sectors, for example four sectors with a size $\pi/2$: $]-\pi/4,+\pi/4],]+\pi/4,+3\pi/4],]+3\pi/4,+5\pi/4],]+5\pi/4,+7\pi/4]$.

The phase rotation follow-up module updates an algebraic counter, $C_n$, of crossing the phases $(2\kappa+1)\pi/4$, by the phase rotation. The counter is algebraically insofar as it is incremented during a crossing in the anti-clockwise direction and decremented in the reverse direction. The index n herein indexes the information symbols. The counter is initialized at the reference instant, for example at the preamble end, before receiving the information symbols in the payload, that is $C_0=0$.

Figure 7:
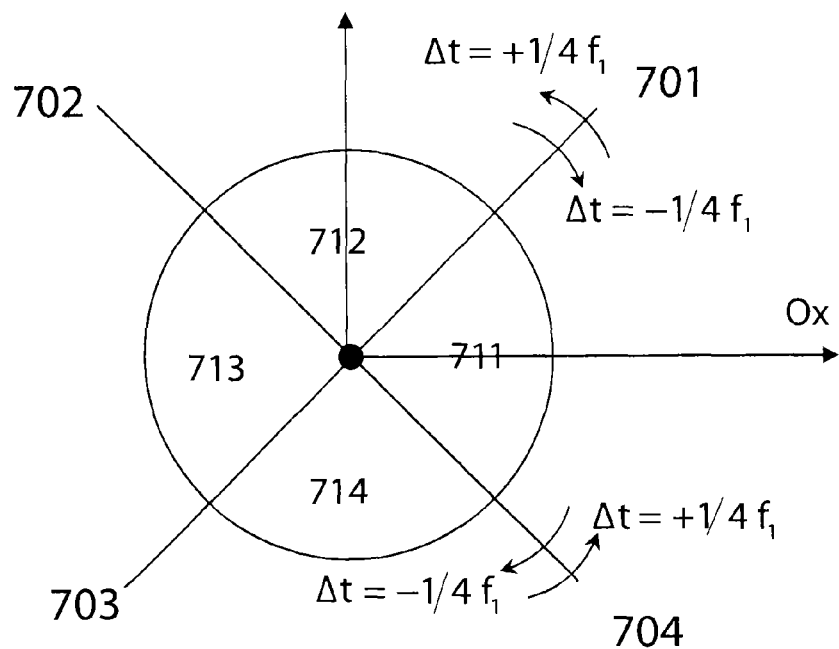
FIG. 7 illustrates a method for detecting a phase crossing within the phase rotation follow-up module in the receiver of FIG. 4.

FIG. 7 graphically represents how the phase crossings are detected.

The half-lines 701-704 at angles $\pi/4$, $3\pi/4$, $7\pi/4$, $9\pi/4$ with the axis Ox respectively bound 4 sectors 711-714. When the phase rotation crosses a boundary between two consecutive sectors either in the counter clockwise direction, either in the reverse direction, this crossing is algebraically counted by the counter $C_n$.

More precisely, the phase crossing detector first brings back the phase of $z_n$ obtained by the accumulator (the indexation by n corresponds to the current information symbol) into the quadrant $[-\pi/4, \pi/4]$ by means of:

$z_n=z_n$ if $C_n=0$ modulo 4

$z_n=-jz_n$ if $C_n=1$ modulo 4

$z_n=-z_n$ if $C_n=2$ modulo 4

$z_n=jz_n$ if $C_n=3$ modulo 4 \qquad (22)

Then, it detects whether the phase of $z_n$, brought back into the first quadrant, is higher than $\pi/4$ or lower than $-\pi/4$. For this, it first tests whether $|\text{Im}(z_n)|>\text{Re}(z_n)$. If yes, there has actually been a phase crossing during the time-symbol. Thereby, thanks to the sign of $\text{Im}(z_n)$, it is distinguished whether this crossing has been made in the counter clockwise direction ($\text{Im}(z_n)>0$) or in the reverse direction ($\text{Im}(z_n)<0$). In the first situation, the counter $C_n=C_{n-1}+1$ is incremented and in the second one, it is decremented $C_n=C_{n-1}-1$. Yet, if $|\text{Im}(z_n)|\leq\text{Re}(z_n)$, there is no phase crossing and thus $C_n=C_{n-1}$.

When there is a phase crossing, the phase estimator indicates it by means of the controlling means in the form of a signed bit (+1 or −1, the null value meaning however the absence of crossing).

The controlling means then vary the positions of the P time windows by a time equal to −sgn($C_n$)/2$f_1$ and in parallel, the follow-up module estimator updates its counter by means of $C_n = C_n − 2\ \text{sgn}(C_n)$ to take the time drift compensation already performed into account.

It will be understood that, for the drift compensation to be properly performed, the phase rotation on a time-symbol has to be lower in absolute value than π/4, in other words the time sliding of the integration windows between two successive pulses has to be lower than 1/(8RL$f_1$). Failing that, there is a phase folding over a time-symbol and thus an ambiguity on the sliding. To relax this requirement, a pre-compensation of the time sliding can be provided at the controlling means 495 and, optionally, a complementary phase de-rotation at the output of the analog-to-digital converters 471-472, so as to only have to compensate on a time-symbol, for a residual phase shift lower in absolute value than π/4. The pre-compensation could use a coarser estimation of the phase shift obtained in a known manner per se.

Figure 8:
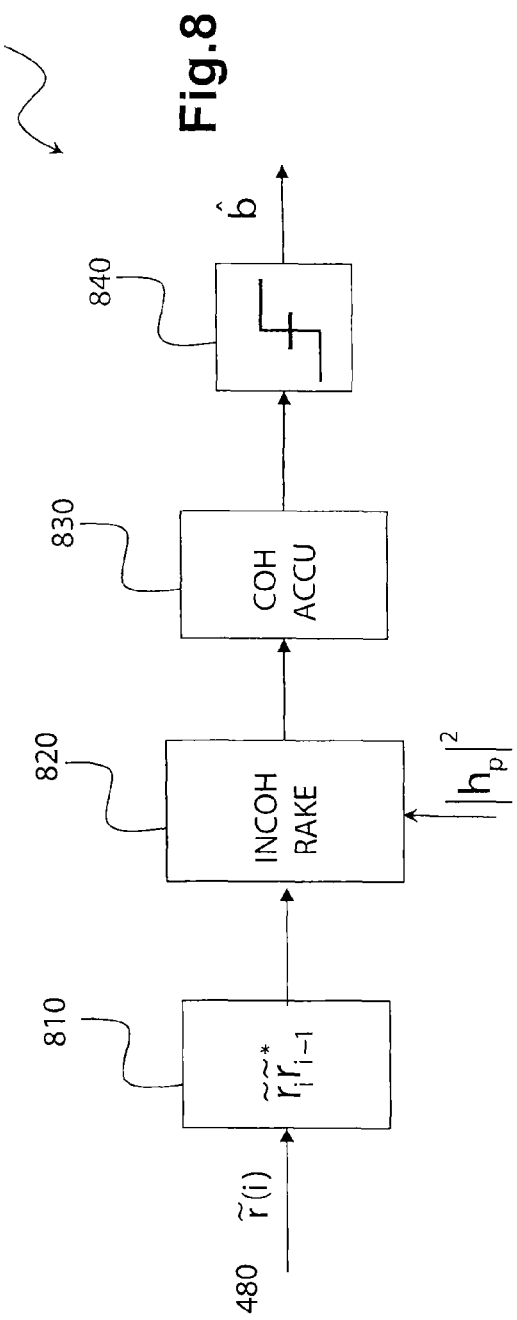
FIG. 8 schematically represents an exemplary embodiment of the demodulating and decision making module in the receiver of FIG. 4.

The structure of the demodulating and detecting module 491 is schematically represented in FIG. 8. It is reminded that it receives the correlation results from the module 480 (or directly the samples of the ADC converters in the absence of coding).

If the modulation used at the transmitter is a differential modulation, the module 491 comprises hermitian multiplication means 810. These means multiply the current correlation result with the conjugate of the correlation result LT$_1$ obtained earlier. Thus, a differential demodulation is performed for each of the channel paths. It will be understood that these means 810 are absent when the modulation is direct (PSK or PPM).

The module 491 then comprises a RAKE filter 820 to combine the contributions of the different channel paths. This RAKE filter will be generally a non-coherent one, that is the contributions of the different paths will be weighted by the quadrature modules of the coefficient of the different paths). On the other hand, when the modulation is a PSK modulation, the RAKE filter must be coherent (MRC combination).

After the combination of the different paths, the accumulating module 830 accumulates the contributions relating to the R symbols from a same information symbol. It provides a result accumulated at each time-symbol.

The decision making module 840 then makes a hard decision (sign detection on the real part in the case of a DBPSK modulation) on the accumulated result to provide an estimation $\hat{b}$ of the information symbol transmitted during the time-symbol. The information symbol $\hat{b}$ is transmitted to the phase estimator 492.

The invention claimed is:

1. A time drift tracking Ultra Wide Band (UWB) receiver, for receiving a pulsed UWB signal, the pulsed UWB signal comprising pulses following each other with a first repetition period ($T_c$), modulated at a carrier frequency, said pulsed UWB signal being further modulated to transmit information symbols, each information symbol being transmitted over a time-symbol (RL$T_c$) during which the information symbol is repeated a plurality (R) of times, said UWB receiver comprising:

a quadrature mixer for translating in baseband said pulsed UWB signal using a translation frequency, equal, within an offset frequency amount, to said carrier frequency;

an integrating stage for integrating said signal thus translated in baseband, during selected time windows, each selected time window being repeated with a second period ($T_1$);

a sampling stage for sampling the integration results on said selected time windows and providing a complex sample for each of them;

a demodulating/detecting module, implemented by circuitry of the UWB receiver, for estimating said information symbols from the complex samples thus obtained;

said UWB receiver further comprising:

a phase estimator, for estimating at each time-symbol, a phase of the complex samples, free of a modulation due to the information symbols thus estimated;

a phase rotation follow-up module, implemented by the circuitry, receiving a rotation of a phase recently estimated from a reference instant for a current time-symbol and a rotation of phase previously compensated from this same instant at a previous time-symbol, and deducing therefrom a non-compensated phase rotation based on a difference between the recently estimated phase rotation and the previously compensated phase rotation; and a controller, implemented by the circuitry, for applying a time offset to said time windows to compensate for said non-compensated phase rotation for the current time symbol, wherein the phase rotation follow-up module receives the rotation of phase previously compensated for the previous time symbol from the controller.

2. The UWB receiver according to claim 1, wherein the controller receives the non-compensated phase rotation, $\Delta\Phi_{uc}$, and offsets the time windows as well as the sampling instants by $$-\frac{\Delta\Phi_{uc}}{2\pi f_1},$$

the time offset being applied to each time-symbol which $f_1$ is a frequency provided by a local oscillator.

3. The UWB receiver according to claim 1, wherein the controller receives the non-compensated phase rotation, $\Delta\Phi_{uc}$, compares it with a threshold value $\Delta\Phi_{th}$, and when $|\Delta\Phi_{uc}|$ exceeds the threshold value, offsets the integration windows as well as the sampling instants by $$-\frac{\Delta\Phi_{th}}{2\pi f_1}\text{sgn}(\Delta\Phi_{uc})$$

where sgn($\Delta\Phi_{uc}$) is the sign of $\Delta\Phi_{uc}$.

4. The UWB receiver according to claim 1, wherein the phase estimator estimates the phase of the complex samples, free of the modulation effect, from the complex samples relating to the highest energy path of the transmission channel.

5. The UWB receiver according to claim 1, wherein the phase estimator comprises a coherent RAKE filter for combining complex samples relating to different paths of the transmission channel using complex coefficients of these paths, the phase of the complex samples free of the modulation effect being then estimated from thus combined complex samples.

6. The UWB receiver according to claim 1, wherein each time-symbol contains a plurality of modulation symbols associated with the information symbol transmitted on this time-symbol, each modulation symbol being spread using a spreading code with a length L≥1 to provide a coded sequence, each chip of the coded sequence modulating a pulse of the UWB signal, the UWB receiver comprising a correlating stage, correlating the complex samples with the spreading code before providing them to the demodulating/detecting module as well as to the phase estimator.

7. The UWB receiver according to claim 6, wherein said modulation symbols are obtained from the repeated information symbols, by a process of PSK type modulation.

8. The UWB receiver according to claim 6, wherein said modulation symbols are obtained from the repeated information symbols, by a process of a PPM type modulation.

9. The UWB receiver according to claim 6, wherein said modulation symbols are obtained from the repeated information symbols, by a process of DBPSK modulation.

10. The UWB receiver according to claim 9, wherein the phase estimator comprises a repeater for repeating the information symbols provided by the demodulating/detecting module, a DBPSK modulator for generating modulation symbols from the information symbols thus repeated, a coherent accumulator for accumulating the complex samples signed by the successive modulation symbols and a phase calculating module, implemented by the circuitry, for determining the phase of the sum thus accumulated.

11. The UWB receiver according to claim 10, wherein the phase rotation follow-up module comprises a detector of crossings of the phases $(2\kappa+1)\pi/4$, $\kappa=0,1,2,3$, the detector algebraically counting the crossings, a crossing in the counter clockwise direction being counted at a first polarity and a crossing in the clockwise direction being at a reverse polarity to the first polarity.

12. The UWB receiver according to claim 9, wherein the demodulating/detecting module comprises a hermitian multiplication module, implemented by the circuitry, for providing the hermitian product of each complex sample with the preceding sample, an incoherent RAKE filter for combining the hermitian products relating to different paths of the transmission channel, a coherent accumulator for accumulating the combined hermitian products thus obtained over the duration of a time-symbol and a decision making module for making, at each time-symbol, a hard decision on the information symbol from the accumulation result provided by the coherent accumulator.

13. A method for receiving, with time tracking, a pulsed Ultra Wide Band (UWB) signal, the pulsed UWB signal comprising pulses following each other with a first repetition period ($T_c$), modulated at a carrier frequency, said pulsed UWB signal being further modulated for transmitting information symbols, each information symbol being transmitted over a time-symbol ($RLT_c$) during which the information symbol is repeated a plurality (R) of times, said method comprising:
 a step of quadrature mixing for translating in baseband said pulsed UWB signal using a translation frequency, equal, within an offset frequency amount, to said carrier frequency;
 a step of integrating the signal thus translated in baseband, during selected time windows, each selected time window being repeated with a second period ($T_1$);
 a sampling step for sampling the integration results on said time windows and providing a complex sample for each of them;
 a demodulating/detecting step for estimating said information symbols from the complex samples thus obtained;
said method further comprising:
 a phase estimating step estimating, at each time-symbol, a phase of the complex samples, free of the modulation due to the information symbols thus estimated;
 receiving a rotation of a phase recently estimated from a reference instant for a current time-symbol and a rotation of phase previously compensated from this same instant for a previous time-symbol, and deducing therefrom a non-compensated phase rotation based on a difference between the recently estimated phase rotation and the previously compensated phase rotation; and
 a step of controlling, by a controller, the time windows applying a time offset to said time windows to compensate for said non-compensated phase rotation for the current time symbol,
 wherein the receiving step further includes receiving the rotation of phase previously compensated for the previous time symbol from the controller.

14. The receiving method with time tracking according to claim 13, wherein each time-symbol contains a plurality of modulation symbols associated with the information symbol transmitted over this time-symbol, each modulation symbol being spread using a spread code with a length L≥1 to provide a coded sequence, each chip of the coded sequence modulating a pulse of the UWB signal, said method further comprising a correlating step correlating the complex samples with the spread code before providing them to the demodulating/detecting step and the phase estimating step.

* * * * *